US006918692B2

(12) United States Patent
Yang

(10) Patent No.: US 6,918,692 B2
(45) Date of Patent: Jul. 19, 2005

(54) DECORATIVE OPTICAL FIBER ARTIFICIAL PLANT

(75) Inventor: Chen-Sheng Yang, Kaohsiung (TW)

(73) Assignee: Chao Tai Electron Co., Ltd., Kaohsiung (TW)

( * ) Notice: Subject to any disclaimer, the term of this patent is extended or adjusted under 35 U.S.C. 154(b) by 81 days.

(21) Appl. No.: 10/404,973

(22) Filed: Mar. 31, 2003

(65) Prior Publication Data

US 2004/0190284 A1 Sep. 30, 2004

(51) Int. Cl.[7] ............................... F21S 6/00; F21V 8/00
(52) U.S. Cl. ..................... 362/567; 362/123; 362/554; 428/18
(58) Field of Search ................................ 362/554, 563, 362/564, 122, 123, 805, 567; 428/18, 17

(56) References Cited

U.S. PATENT DOCUMENTS

| | | | | |
|---|---|---|---|---|
| 6,361,198 B1 | * | 3/2002 | Reed ............................ 362/554 |
| 6,653,797 B2 | * | 11/2003 | Puleo et al. .............. 315/185 S |
| 6,672,750 B1 | * | 1/2004 | Kao ............................ 362/567 |
| 6,739,746 B1 | * | 5/2004 | Tang ........................... 362/568 |
| 2004/0066658 A1 | * | 4/2004 | Leung et al. ................ 362/555 |
| 2004/0141334 A1 | * | 7/2004 | Wang .......................... 362/554 |

* cited by examiner

*Primary Examiner*—Y. My Quach-Lee
*Assistant Examiner*—Peggy A. Neils
(74) *Attorney, Agent, or Firm*—Dellett & Walters

(57) ABSTRACT

A decorative optical fiber artificial plant has a base and an artificial foliage arrangement. The base has a housing and a colored light generator mounted in the housing. The artificial foliage arrangement is composed of multiple optical fibers and is connected to a specific position of the housing on which colored lights shines. The colored light generator has multiple LEDs and a controller to drive the LEDs. The controller has at least a microprocessor and multiple electronic switches connected between output ports of the microprocessor and the corresponding LEDs. Further, different driving programs are built into the microprocessor so the colored light generator can generate different color lights with various characteristics.

5 Claims, 5 Drawing Sheets

US 6,918,692 B2

DECORATIVE OPTICAL FIBER ARTIFICIAL PLANT

BACKGROUND OF THE INVENTION

1. Field of the Invention

The present invention relates to a decorative optical fiber artificial plant, and more specifically to a decorative optical fiber artificial plant having various colors of light.

2. Description of Related Art

To provide safe decorations that can be used for a long time and can be reused seasonally, decorative artificial plants with lights have been developed. The conventional artificial plant has the capability to change the color of its light to increase its visual diversification. With reference to FIG. 4, a conventional artificial plant with lights has a base (50) and a decorative artificial foliage arrangement (60) mounted in the base (50). The artificial foliage arrangement (60) is composed of a bundle of optical fibers (61) and decorative leaves (62) or the like. With further reference to FIG. 5, the base (50) has a housing (51) and a light generator (52) mounted in the housing (51). The housing (51) has a mounting cylinder (53) into which light from the light generator (52) shines. The bundle of optical fibers (61) has a proximal end (63) mounted in the mounting cylinder (53). The light generator (52) has a motor (54) with a shaft (541), a multicolored transparent disk (55) and a bulb (56). The multicolored transparent disk (55) is divided into sections (not numbered) of different colors and is mounted on the shaft (541). The bulb (56) faces the multicolored transparent disk (55) and the mounting cylinder (53). The multicolored transparent disk (55) is mounted between the bulb (56) and the multicolored transparent disk (55) so light from the bulb (56) passes through the multicolored transparent disk (55) and changes the color of the light. The colored light shining on the mounting cylinder (53) shines on the proximal end (63) of the bundle of optical fibers (61), and each optical fiber (61) transmits and displays the colored light.

The motor (54) rotates the multicolored transparent disk (55) so the light shining on the proximal end (62) of the bundle of fibers through the multicolored transparent disk (55) changes colors. Therefore, the optical fibers (61) display various colors. However, the conventional optical fiber decorative artificial plant is expensive and unsafe, has dull colors, etc. The light generator (52) usually uses a 12V/10W to 12V/12W bulb, which generates heat and makes the temperature rise in the housing (51). The housing made of plastic and wires to the bulb and motor can be melted and cause an accidental fire so the resistant to heat is not good. Furthermore, the motor and the bulb consume much power, so the conventional optical fiber decorative artificial plant does not conserve electricity. Further, the multicolored transparent disk has fixed colors and rotating speed so the color changes of the optical fibers are dull.

The present invention provides a decorative optical fiber artificial plant to mitigate or obviate the aforementioned problems.

SUMMARY OF THE INVENTION

An objective of the present invention is to provide a decorative optical fiber artificial plant that is safe and saves power.

Another objective of the present invention is to provide an artificial plant with a simple light generator to reduce cost.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
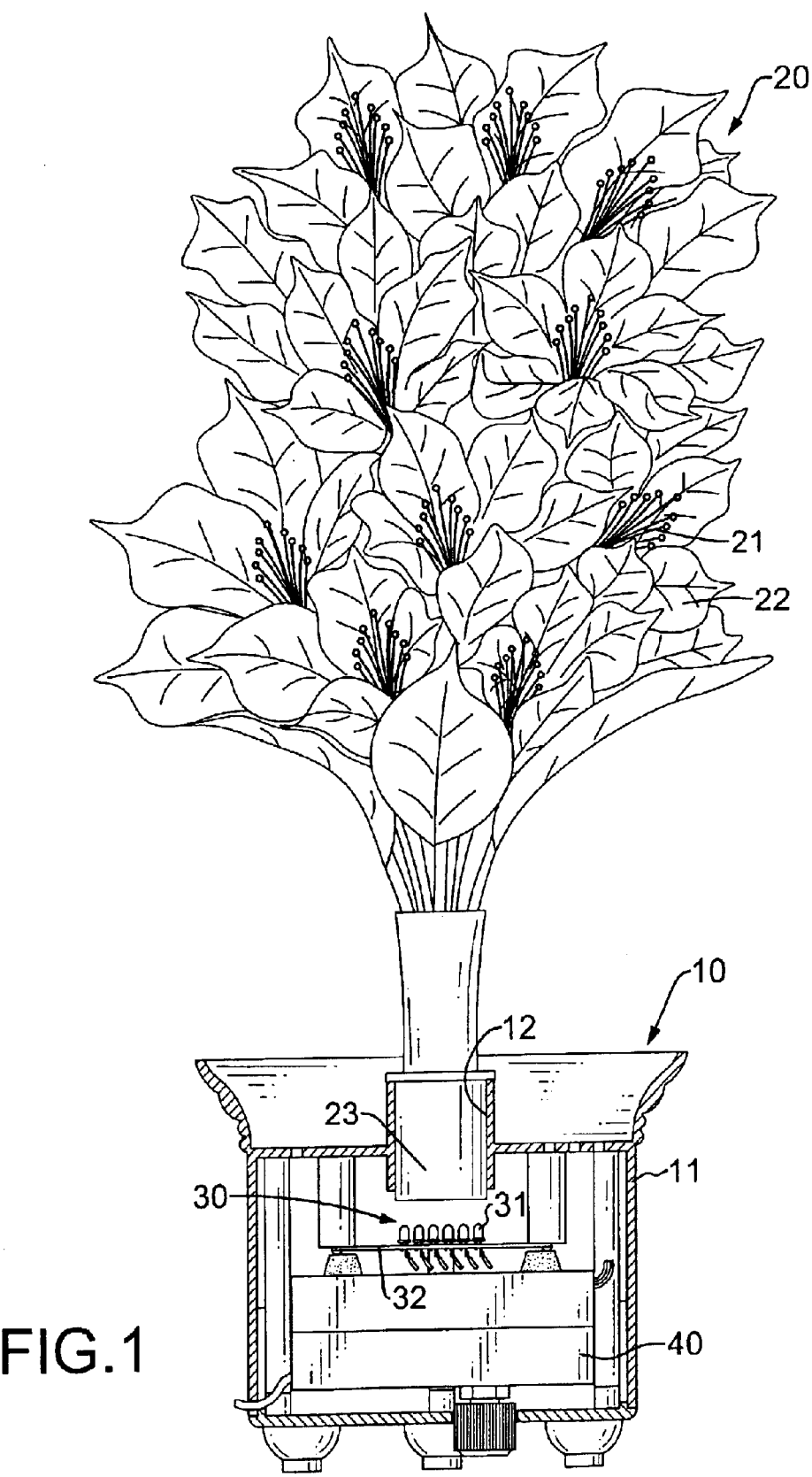
FIG. 1 is side plan view in partial section of a decorative optical fiber artificial plant in accordance with the present invention.

With reference to FIG. 1, an optical fiber artificial plant includes a base (10), an artificial foliage arrangement (20). The artificial foliage arrangement (20) is composed of a bundle of optical fibers (21) and decorative leaves (22) or the like. The base (10) has a housing (11) and a colored light generator (30) mounted in the housing (11). The housing (11) has a mounting cylinder (12) into which light from the light generator (30) shines. The bundle of optical fibers (21) has a proximal end (23) mounted in the mounting cylinder (12).

Figure 2:
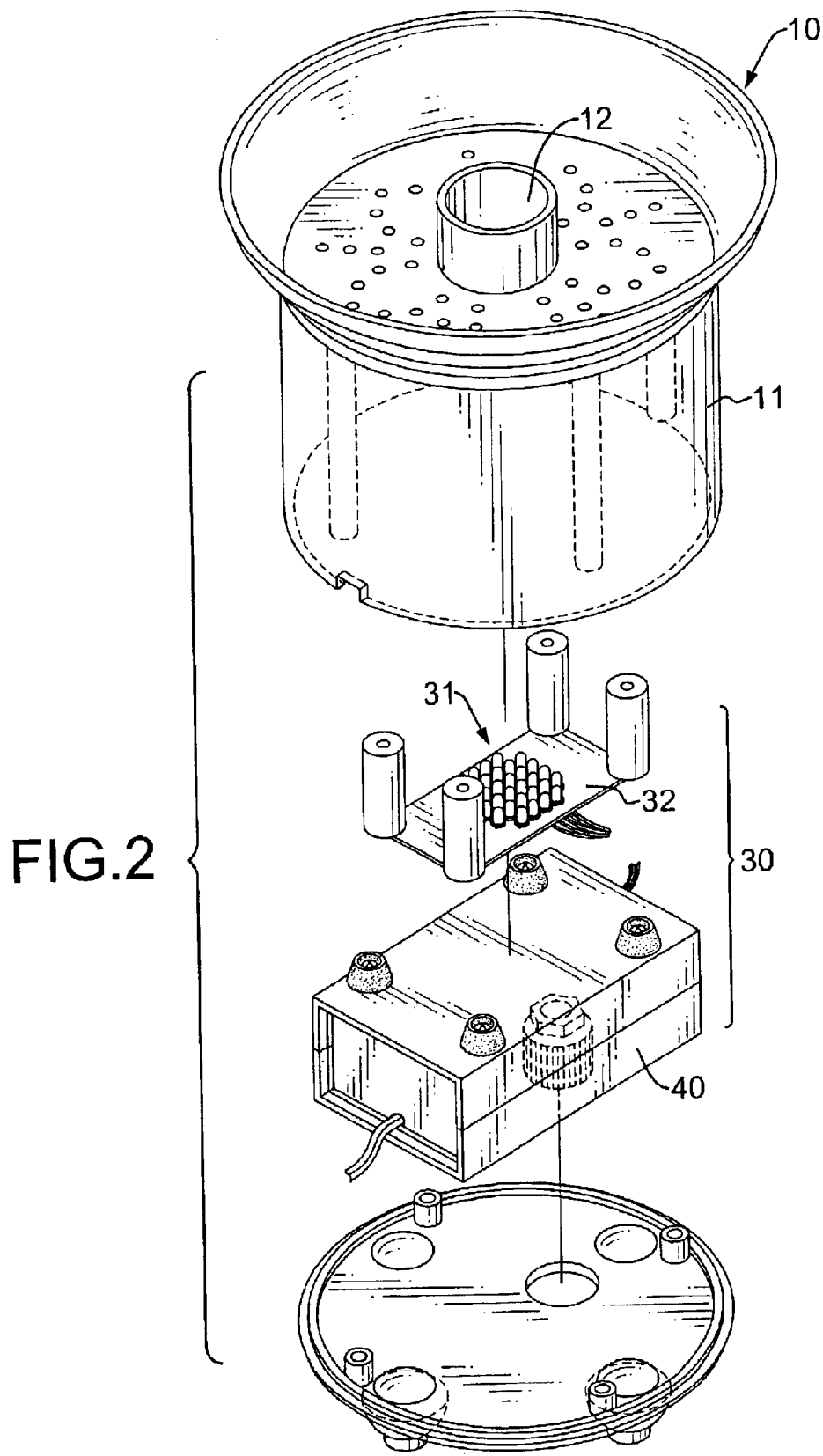
FIG. 2 is an exploded perspective view of the base in FIG. 1.
Figure 3:
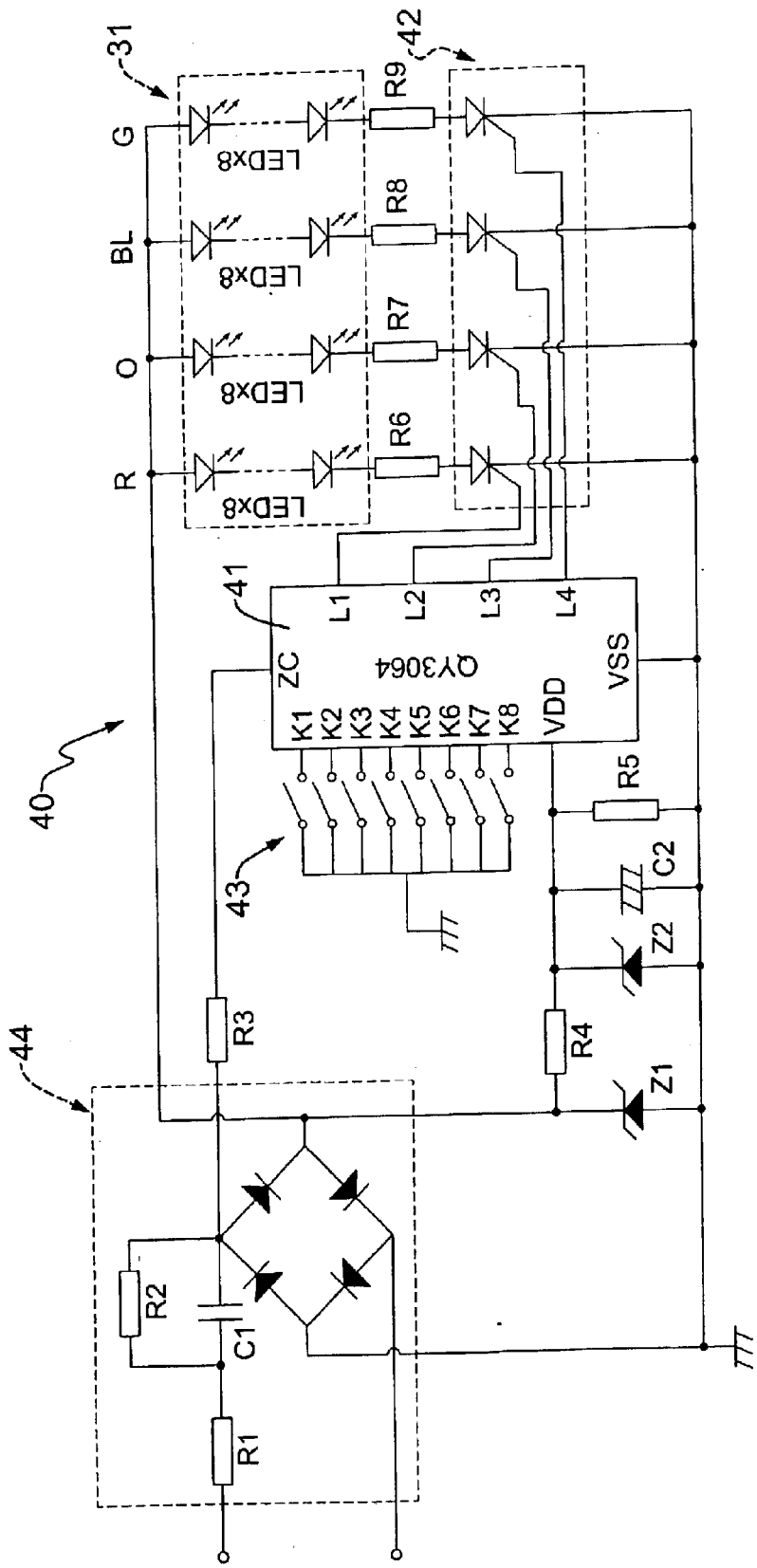
FIG. 3 is a schematic diagram of a circuit to control a colored light generator of the decorative optical fiber artificial plant in FIG. 1.
Figure 4:
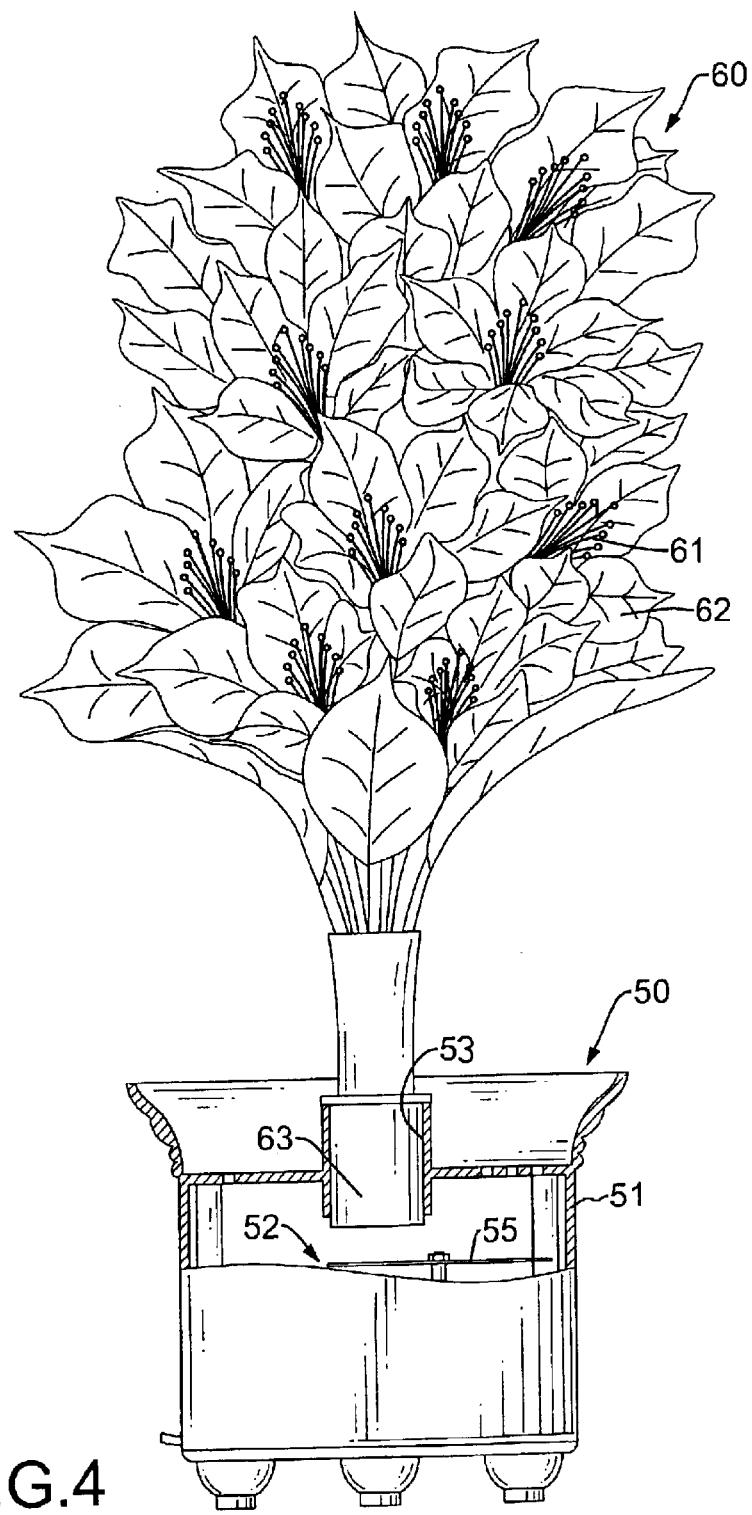
FIG. 4 is a side plan view in partial section of a conventional optical fiber artificial plant in accordance with the prior art.
Figure 5:
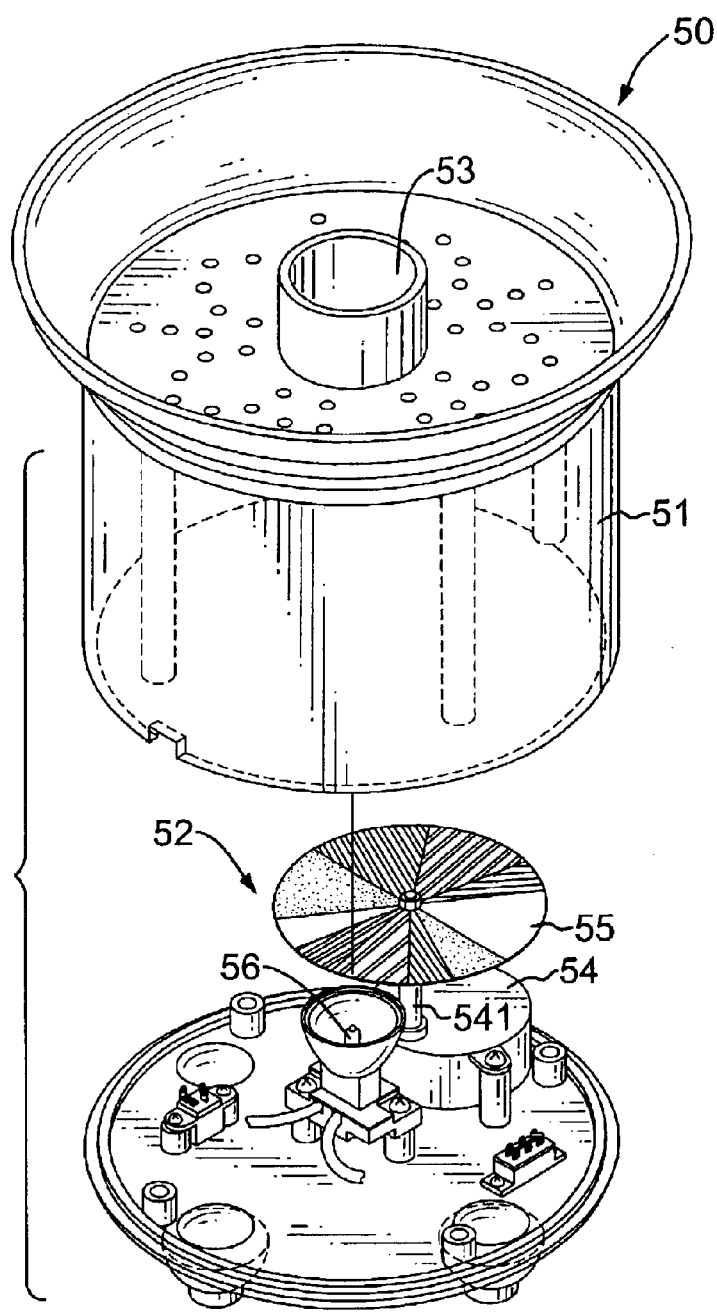
FIG. 5 is an exploded perspective view of a base of the conventional optical fiber artificial plant in FIG. 4.

With further reference to FIG. 2, the colored light generator (30) has a controller (40) and multiple LEDs (31) mounted on a PCB (320). Each LED (31) is connected to the controller (40) and faces the mounting cylinder (12). With reference to FIG. 3, the controller (40) has a microprocessor (41), multiple electronic LED switches (42), a selector (43) and an AC to DC power converter (44). The microprocessor (41) has multiple selector input ports (K1 to K8) and multiple output ports (L1 to L4). The electronic switches (42) are connected respectively to the output ports (L1 to L4) of the microprocessor (41) and corresponding LEDs (31). The electronic switches (42) can be silicon controlled rectifier (SCR) or triode AC switch (TRIAC). The selector (43) has multiple connections connected respectively to the selector input ports of the microprocessor (41). The AC to DC power converter (44) converts AC power to DC power that is provided to the microprocessor (41) and electronic switches (42).

The microprocessor (41) has different programs to drive different colored LEDs (31). Each program is selected by a unique combination of connections in the selector (42). The selector (42) can be a knob having multiple switches.

For example, one combination of connections in the selector (42) is selected, and the microprocessor (41) can output driving signals to specific electronic switches (42) to drive specific LEDs (31). The lights from the different LEDs (31) shine on the proximal end (23) of the bundle of optical fibers (21) in the mounting cylinder (12). Thus, each optical fiber (21) displays the color. Further, the microprocessor (41) can control the driving time to make the LED (31) blink, flash, pulsate, etc. Therefore, the optical fiber (21) can display different colors with different optical characteristics.

Based on the forgoing description, the decorative optical fiber artificial plant uses low power LEDs (31) as a light source so heat is not generated to burn the base (10) or wires even when the LEDs (31) are driven for a long time. Again, the light generator (30) only uses LEDs (31) and a controller (40) to generate various colored light in the optical fibers to simplify the structure of the light generator (30). Therefore, the present invention is inexpensive to manufacture. Further, the light generator (30) can generate different colored lights and characteristics of the light. Therefore, the artificial plant has more light diversification than the conventional artificial plant with a motor and multicolored transparent disk.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A decorative optical fiber artificial plant comprising:

a base having a housing and a colored light generator mounted in the housing, wherein the housing has a mounting cylinder into which colored light from the colored light generator shines; and the colored light generator has multiple LEDs and a controller to drive the LEDs, wherein the controller is positioned under the LEDs and comprises:

a microprocessor having multiple input ports and output ports;

multiple electronic switches respectively connected to the LEDs and the output ports of the microprocessor; and an AC to DC power converter connected to the microprocessor and the electronic switches and converting AC power to DC power that is provided to the microprocessor and the electronic switches; and an artificial foliage arrangement mounted in the housing, wherein the artificial plant is composed of a bundle of optical fibers having a proximal end mounted in the mounting cylinder;

whereby the controller controls how long the LEDs are driven to generate different colored lights with various characteristics.

2. The decorative optical fiber artificial plant as claimed in claim 1, wherein the microprocessor has many driving programs and is further connected to a selector that has many connections connected respectively to the input ports to select a specific driving program.

3. The decorative optical fiber artificial plant as claimed in claim 2, wherein the selector is a knob.

4. The decorative optical fiber artificial plant as claimed in claim 1, wherein each electronic switch is a silicon controlled rectifier (SCR).

5. The decorative optical fiber artificial plant as claimed in claim 1, wherein each electronic switch is a triode AC switch (TRIAC).

* * * * *